United States Patent Office 3,524,340
Patented Aug. 18, 1970

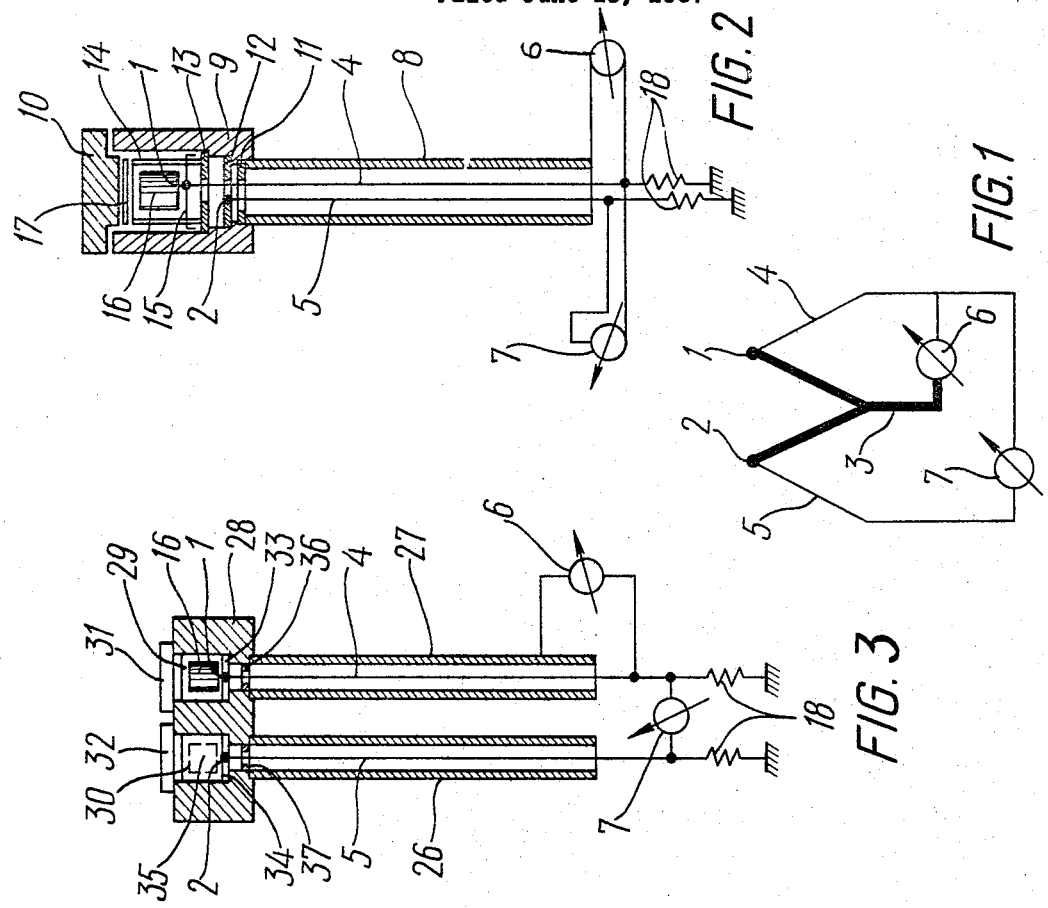

3,524,340
DEVICE FOR DIFFERENTIAL
THERMAL ANALYSIS
Jury Alexandrovich Krakovetsky-Kocherzhinsky, Ulitsa Vladimirskaya 9, kv. 69, and Evgeny Andreevich Shishkin, Ulitsa Klovsky spusk. 12, kv. 50, both of Kiev, U.S.S.R.
Filed June 13, 1967, Ser. No. 645,759
Int. Cl. G01n 25/00
U.S. Cl. 73—15
3 Claims

ABSTRACT OF THE DISCLOSURE

A device for differential thermal analysis, primarily under high temperature conditions (up to 2200° C.) having a common electrode of the differential thermocouple type made in the form of a hollow element including a head containing test and reference specimen chambers and a tublar member connected to the head and made of the same material and housing taut wire electrodes which are connected to screens supported in the head to form junctions therewith. The wire electrodes extend through the tubular member without contact and are connected to a measuring instrument.

---

This invention relates to devices for differential thermal analysis and, more particularly, to thermoelectric pyrometers intended primarily for the physico-chemical analysis of refractory materials at high temperatures.

Known are devices which comprise a heated block with test and reference specimen chambers containing separately disposed hot junctions of differentially connected thermocouples that, for the most part, have a common electrode. However, the known devices have an inadequate sensitivity at a temperature of 1,800° C. and, moreover, are of little use for the detection of transformation in materials under investigation, unless the transformations in question are characterized by an exceptionally high thermal effect.

In order to enhance the sensitivity of differential pyrometers at high temperatures, it has been suggested to employ devices, wherein a reference junction is separated by an intermediate, insulating ceramic plate from a measuring junction which is brought in contact with a test specimen or a crucible containing a test specimen.

This arrangement has made it possible to raise the working temperature limit of differential thermoelectric pyrometers up to 1,200–2,000° C., but the employment of ceramic materials for the electric insulation of electrodes in the zone of high temperatures precludes the use of devices for the examination of refractory materials up to their fusion points, this limitation being due to the fact that at very high temperatures ceramics lose their insulating characteristics and the devices become inoperative.

Accordingly, it is an object of the present invention to provide a device for differential thermal analysis at temperatures above 2,000° C.

It is another object of the present invention to provide a device for differential thermal analysis, that will be reliable and convenient in service, and will allow test specimens to be readily changed and thermocouples to be easily calibrated.

It is also an object of the present invention to provide a device for differential thermal analysis that will be simple in design and economical in operation.

It is a further and more specific object of the present invention to provide a device for differential thermal analysis at high temperatures, wherein the employment of ceramics for the electric insulation of thermocouple electrodes is dispensed with.

The objects are accomplished by a device, according to the present invention, in which the thermocouple wire elements, disposed one adjacent to another without contact, are rigidly connected with one end in hot junction, while the other end of each element is connected to tensioning elements in the low temperature zone.

It is advisable that the common electrode of the differential thermocouple be manufactured as a hollow member having a tubular end portion which serves as a support, and a head element which incorporates the sample and reference chambers with measuring and working junctions. The head of the said common electrode has sufficient size to incorporate said chambers, as well as thick walls, to make uniform the temperature range near said junctions, the tubular portion having a cavity and walls of minimum size to reduce the head heat irradiation.

In accordance with a further embodiment of the present invention, the common electrode is made in the form of two tubular elements, each element housing a longitudinal wire electrode and both elements being closed at one end with a block made from the same material as are the elements, said block forming two chambers.

The present invention is illustrated hereinbelow by the description of exemplary embodiments and accompanying drawings, wherein:

FIG. 1 is a simplified diagram of the measuring device;
FIG. 2 is a sectional view of an embodiment of the device, according to the present invention, wherein use is made of a common tubular electrode with two other wire electrodes disposed within said tubular electrode; and
FIG. 3 is a sectional view of another embodiment of the device according to the present invention, wherein the common electrode is made in the form of two tubular elements, each element housing a wire electrode.

The device for differential thermal analysis comprises a thermocouple measuring hot junction 1 (FIG. 1), which senses the temperature of a test specimen; hot junction 2 of a reference thermocouple, and electrode 3, which is common for both differentially connected thermocouples, separate electrodes 4 and 5 of which thermocouples are connected to measuring instrument 6 for determining the temperature of the test specimen, that has been caused to interact thermally with measuring junction 1. Instrument 7 is intended for determining the temperature difference of the test and the reference specimen.

The present invention is described with reference to a conventional measuring circuit of devices for thermal differential analysis and consists in novel construction of said circuit.

In accordance with an embodiment of the present invention, tubular support 8 (FIG. 2), made of thermoelectrode material, for example, tungsten, supports a block 9, manufactured from the same material and furnished with a cover 10. Block 9 houses three parallel screens, viz, bottom screen 11, middle screen 12, and top screen 13, all the screens being manufactured from the same material as support 8. Screens 11, 12 and 13 have orifices for passing wire electrodes 4 and 5 made, for example from a tungsten-rhenium alloy. Electrode 5 is rigidly affixed to screen 12, and forms at the connection site reference junction 2. Top screen 13 carries cylindrical screen 14 with bridge 15, said cylindrical screen and bridge being made from the same material as support 8. Affixed rigidly to bridge 15 is electrode 4 so that the connection site acts as measuring junction 1. Support 8, block 9, screens 11–13 and bridge 15, manufactured of the same material, form altogether a common electrode 3 of the differential thermocouple (FIG. 1).

Crucible 16 with a test specimen (or a specimen without crucible if the specimen is not to be melted) is placed on bridge 15 with junction 1. Cover 17 closes cylindrical screen 14 from top.

The space confined by screens 13 and 14 and by cover 17 constitutes the test specimen chamber, while a part of the cavity of block 9 confined by screens 11 and 13 serves as the reference specimen chamber, the reference specimen being provided by the material of block 9.

Tensioning elements 18 serve for maintaining wire electrodes 4 and 5 taut.

In another embodiment of the present invention, tubular elements 26 and 27 (FIG. 3), which serve as the common electrode of the thermocouples, carry block 28 with chambers 29 and 30 for a reference and a test specimen, the chambers being closed with covers 31 and 32 respectively. Disposed inside chambers 29 and 30 are bridges 33 and 34, intended for respectively supporting crucible 16 containing a test specimen and reference specimen 35. Affixed to bridges 33 and 34 are separate wire electrodes 4 and 5, which are made taut within tubular elements 26 and 27 by means of tensioning elements 18. In the bottom part, chambers 29 and 30 are closed with screens 36 and 37, having orifices, through which pass wire electrodes 4 and 5. Chambers 29 and 30 are identical and each may serve for mounting either a test or a reference specimen, the actual arrangement of the specimens determining the mode of connecting electrodes 4 and 5 to the measuring circuit.

Although the present invention has been described with reference to preferred embodiments thereof, it will be readily understood by those skilled in the art that other embodiments can be practiced without deviating from the scope of the invention.

We claim:

1. A device for differential thermal analysis which comprises differentially connected thermocouples including a common electrode and hot junctions constituted as a measuring junction and a reference junction, said junctions being connected to said common electrode, said common electrode comprising a hollow element with a tubular end portion, and a head mounted adjacent said end portion; said head being a block having a test specimen chamber containing the measuring junction and a reference specimen chamber containing the reference junction; separate electrodes for said thermocouples constituted as wires having one end fixed to said junctions inside said chambers in said head, said wires passing from said junctions through the common electrode without contact therewith so that the other ends of said wires extend therefrom tensioning means attached to the other ends of the wires extending from the common electrode to maintain the wires constantly taut; and measuring means connected to said other ends of the wire electrodes and to the common electrode.

2. A device according to claim 1 wherein said block and said hollow element are made from the same material, the device further comprising a specimen support constituted of the same material as the block and common electrode in each chamber and connected to the block, the wire electrodes being connected to the respective specimen support means to form said thermocouple junctions therewith for measuring sample and reference specimen temperatures.

3. A device according to claim 1, wherein said hollow element is made in the form of two tubular elements, each element housing a taut wire electrode, both tubular elements being connected at one end to said block which is made from the same material as said tubular elements.

References Cited

UNITED STATES PATENTS

| | | | |
|---|---|---|---|
| 3,218,859 | 12/1965 | McBride et al. | 73—341 |
| 3,303,689 | 2/1967 | Paulik et al. | 73—15 |
| 3,402,079 | 9/1968 | Farrow | 136—228 |
| 3,417,604 | 12/1948 | Bean et al. | 73—13 |

OTHER REFERENCES

Herold, Paul et al. "Modified Differential Thermal Analysis Apparatus" in Journal of The American Ceramic Society, 1948, vol. 31, No. 11, pp. 20–22.

JAMES T. GILL, Primary Examiner

H. GOLDSTEIN, Assistant Examiner

U.S. Cl. X.R.

136—228